Dec. 8, 1970   J. M. BENJAMIN, JR., ET AL   3,546,467
TYPHLOCANE WITH RANGE EXTENDING OBSTACLE SENSING DEVICES
Filed April 21, 1967   6 Sheets-Sheet 1
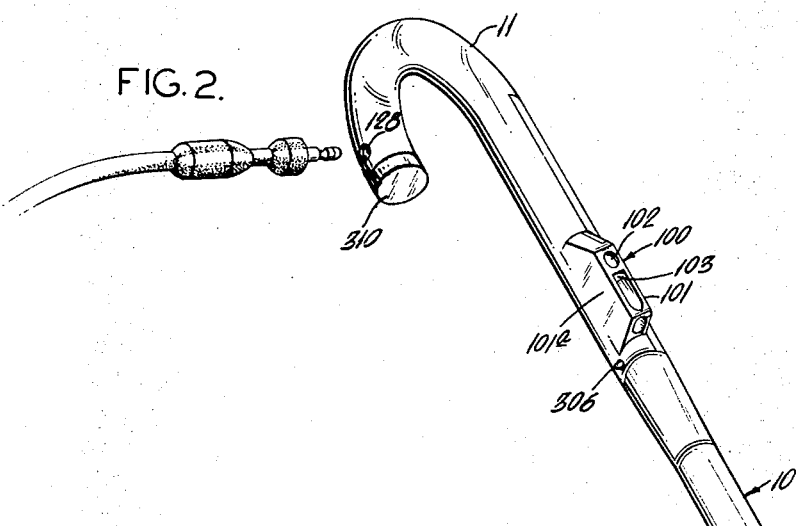
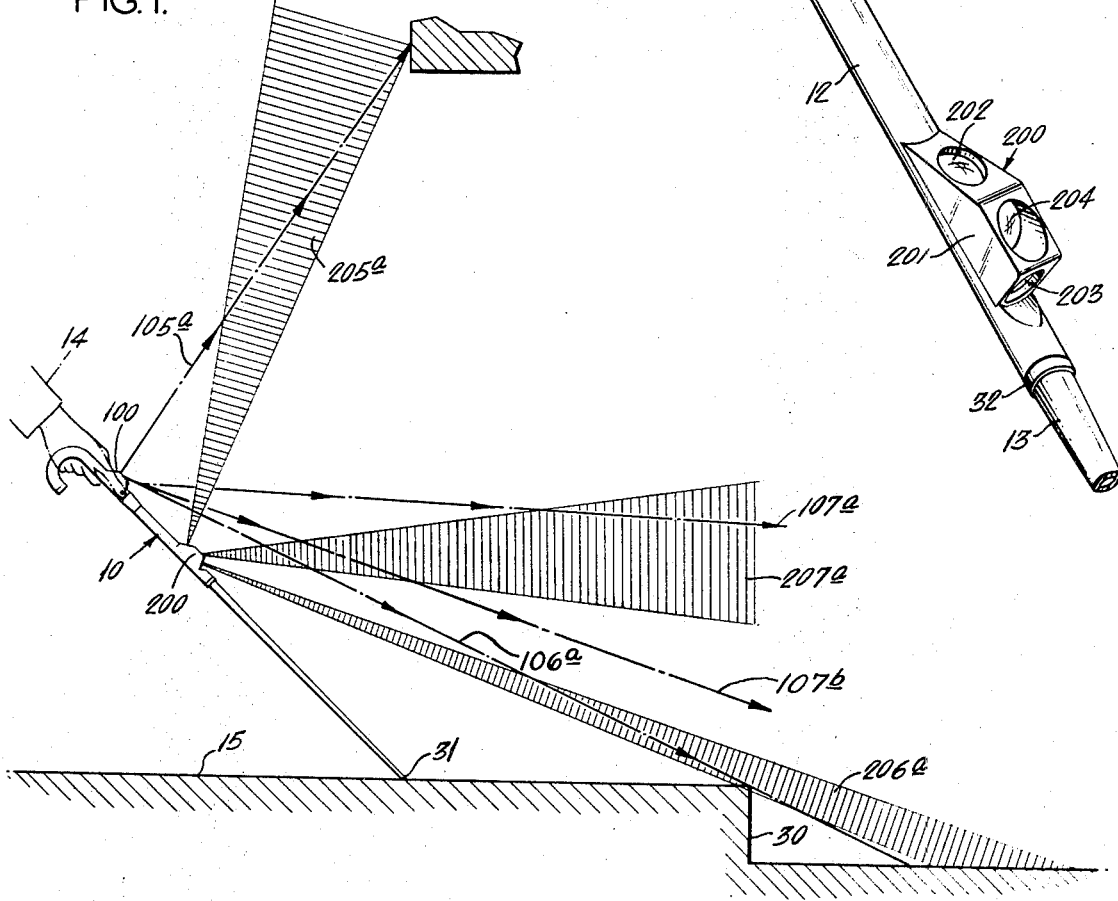
INVENTORS
JOEL MALVERN BENJAMIN, JR.
DUANE RIDGELY BOLGIANO
EDWIN DONNELL MEEKS, JR.
THOMAS A. BENHAM
BY Howson & Howson
ATTYS.

Dec. 8, 1970   J. M. BENJAMIN, JR., ET AL   3,546,467
TYPHLOCANE WITH RANGE EXTENDING OBSTACLE SENSING DEVICES
Filed April 21, 1967   6 Sheets-Sheet 2
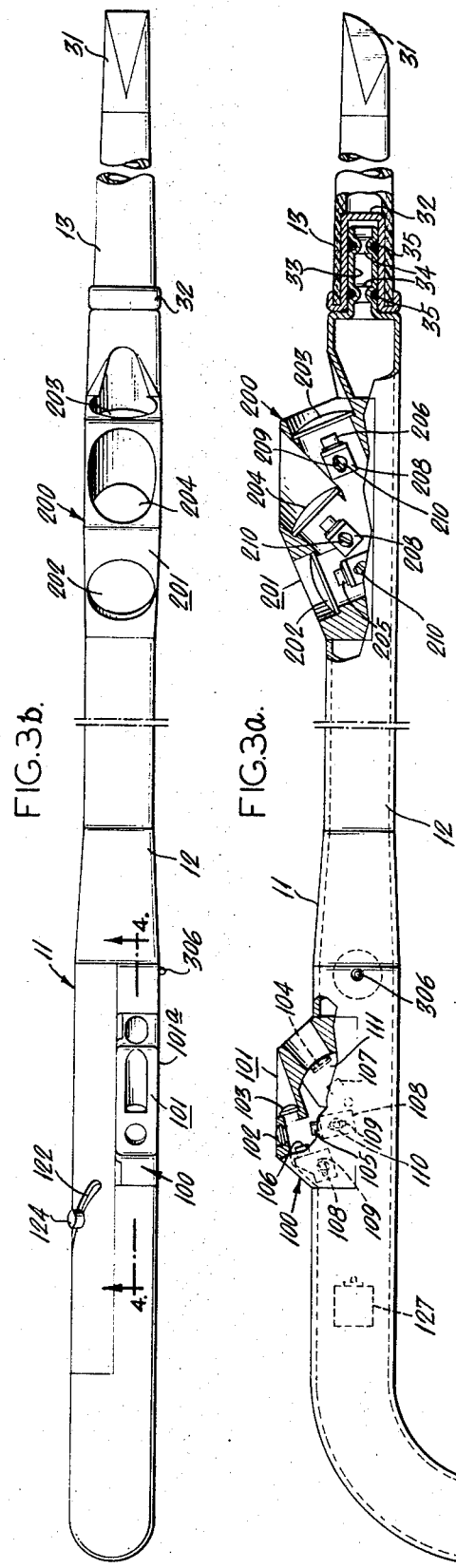
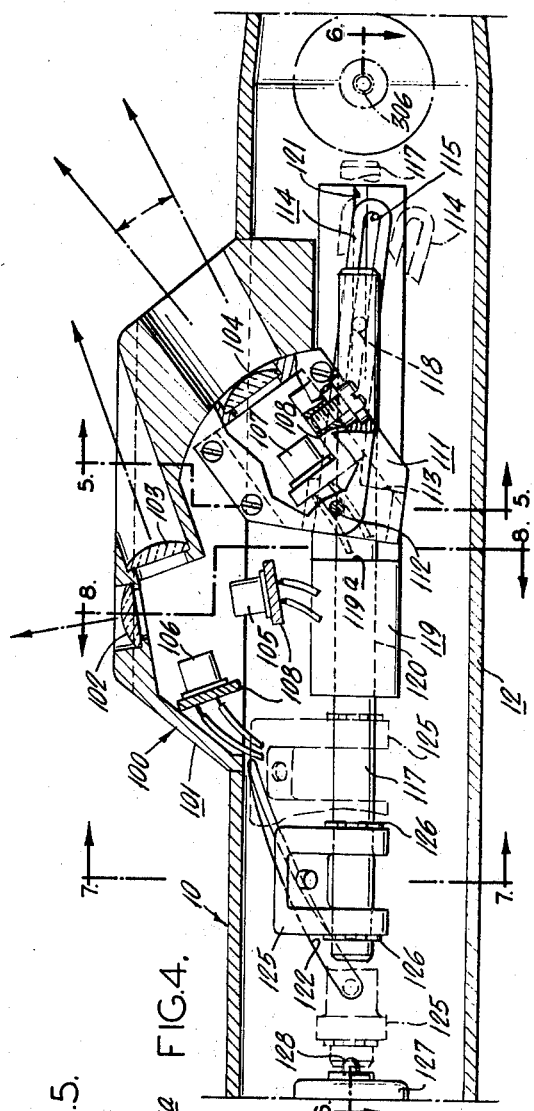
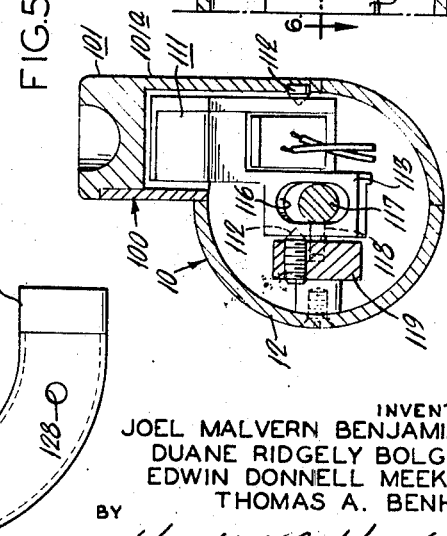
INVENTORS:
JOEL MALVERN BENJAMIN, JR.
DUANE RIDGELY BOLGIANO
EDWIN DONNELL MEEKS, JR.
THOMAS A. BENHAM
BY
Howson & Howson
ATTYS.

Dec. 8, 1970   J. M. BENJAMIN, JR., ET AL   3,546,467
TYPHLOCANE WITH RANGE EXTENDING OBSTACLE SENSING DEVICES
Filed April 21, 1967   6 Sheets-Sheet 3
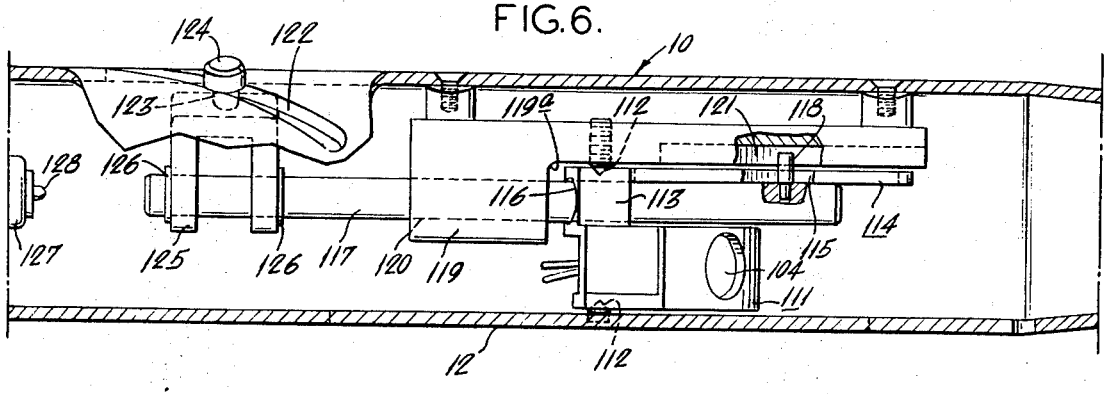
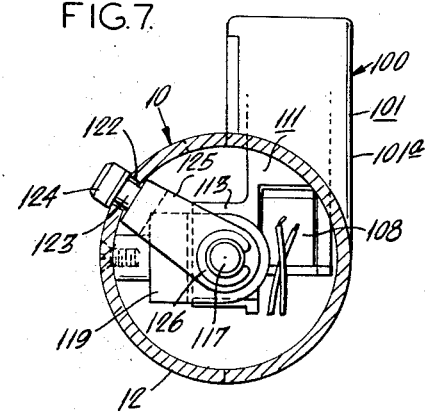
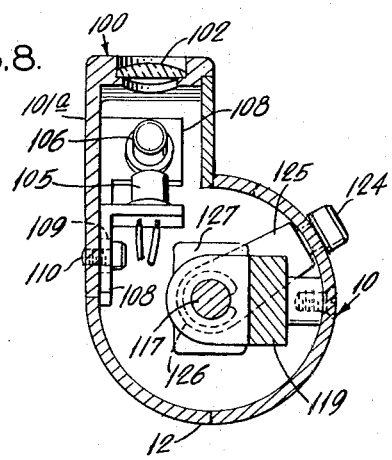
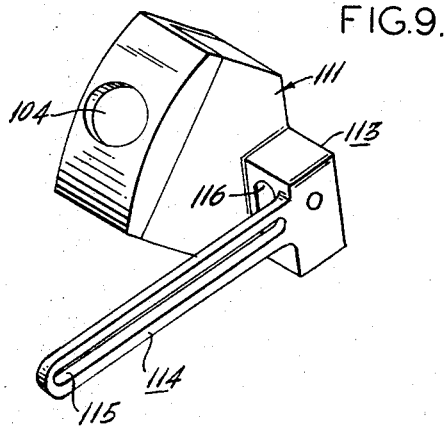
INVENTORS:
JOEL MALVERN BENJAMIN, JR.
DUANE RIDGELY BOLGIANO
EDWIN DONNELL MEEKS, JR.
THOMAS A. BENHAM
BY
Howson & Howson
ATTYS.

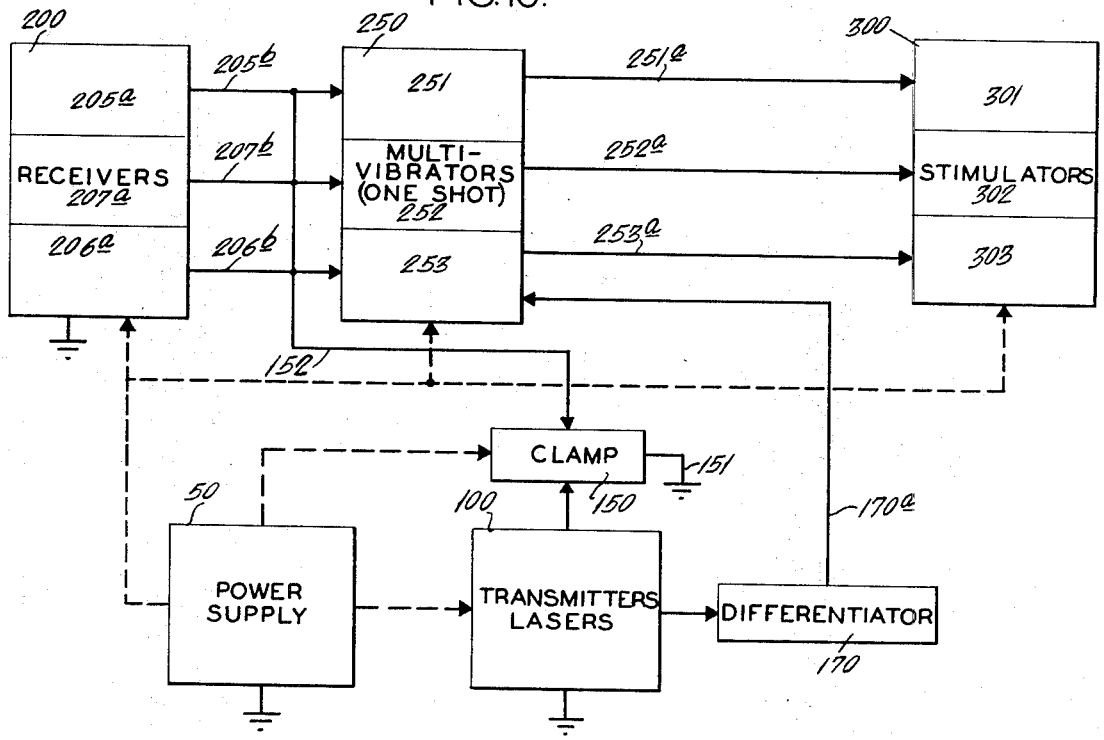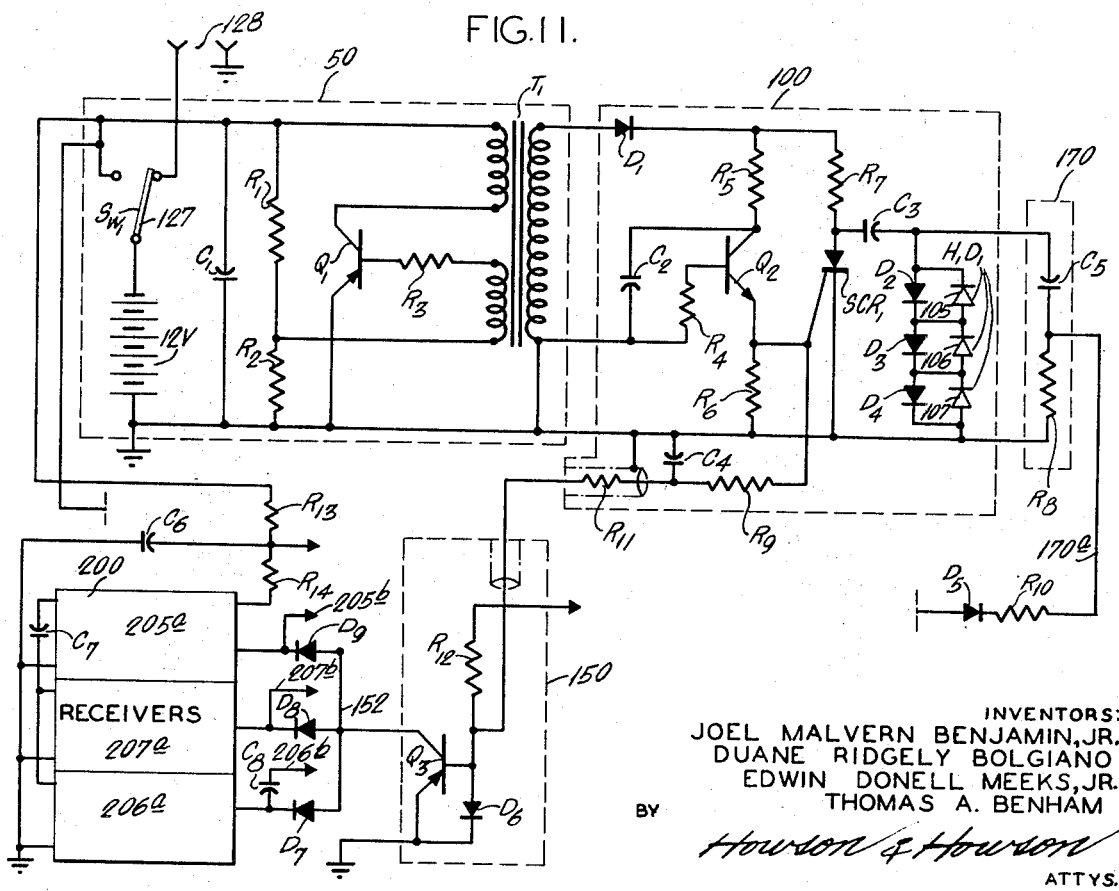

United States Patent Office 3,546,467
Patented Dec. 8, 1970

3,546,467
TYPHLOCANE WITH RANGE EXTENDING
OBSTACLE SENSING DEVICES
Joel Malvern Benjamin, Jr., Philadelphia, Duane Ridgely Bolgiano, Bala Cynwyd, Edwin Donnell Meeks, Jr., Philadelphia, and Thomas A. Benham, Haverford, Pa., assignors to Bionic Instruments, Inc., Bala Cynwyd, Pa., a corporation of Pennsylvania
Filed Apr. 21, 1967, Ser. No. 632,665
Int. Cl. A45b 3/00; G08b; H01j 39/12
U.S. Cl. 250—215
10 Claims

ABSTRACT OF THE DISCLOSURE

A typhlocane having a long extended body, which is preferably separable into pieces, for use by persons having impairment of visual acuity, the cane having a tubular crook and upper shank portion for housing laser transmitters including optics, and spaced longitudinally therefrom along the shank there being optical sensors, each associated with a particular transmitter, the lasers and sensors positioned so that by triangulation the presence of an obstacle, both overhanging, and straight ahead will be detected, and the absence of an object, such as a dropoff from ground level will also be detected. Each sensor is connected to circuitry which actuates an associated stimulator so that the presence of an obstacle in the former cases and the absence of the ground in the latter case give stimuli in the form of sound and feel to the holder of the cane.

SUMMARY OF THE INVENTION

The present invention relates to a cane for aiding the acumen of persons having impairment of visual acuity. More specifically the present invention relates to a cane for aiding the sensory perception of individuals having little or no visual acuity, the cane comprising at least a tubular longitudinally extending shank, having at least one coherent light transmitting means mounted on the shank directed outwardly and away therefrom so as to emit discrete, low duty cycle pulses of coherent light away from the carrier of the cane. Located on the shank and longitudinally spaced from the transmitter is a receiver to receive light reflections from objects forward of the cane and in the path of the carrier. The receiver is connected to a stimulator means which operates to warn the carrier of the cane of an obstacle forward of the cane.

BACKGROUND OF THE INVENTION

For several years various institutions have conducted research into the development of travel aids for aiding the sensory perception of individuals having little or no visual acuity. These systems are designed for the able-bodied individual who lacks only vision, and who can normally find his way about relatively safely at speeds of three to four miles an hour. In most instances, individuals lacking vision have developed other senses which are equal to or superior to the same senses possessed by an individual who is not blind. The objective is to aid the blind traveler by warning him of obstacles in his path between three and twelve feet in front of him in his intended direction of travel. An important consideration has been the provision of warning devices which will inform the traveler of approaching large down-steps, for example flights of stairs, open manholes, edges of subway platforms, etc. as well as overhanging obstacles such as awnings, tree limbs, and the like which can cause serious head injuries if not otherwise detected. As most blind people carry a cane, it is believed that ideally the aid should be built into the cane, while simultaneously not radically altering the feel of the cane so that the cane may still be used as an extension of the hand of the traveler.

An early warning device for the blind traveler was built during World War II by L. E. Cranberg ("Sensory Aid for the Blind," Electronics, McGraw-Hill, p. 116, March 1946), which device did not resemble in any shape or form that of a cane, but looked rather like a lady's handbag. Cranberg's device emitted light from an incandescent lamp and picked up reflections from obstacles in the path of the light by a lead sulfide photodetector placed in the image plane behind a receiving lens. The angle of the received light depended on the separation between the lenses and on the range between the obstacle and the transmitting and receiving lenses. In order to prevent inadvertent triggering of the photodetector by ambient light, the transmitted light beam was chopped and the receiving amplifier was keyed to the chopper frequency to increase the signal to noise ratio of the system.

In terms of brightness it is difficult to better an incandescent lamp, but an incandescent lamp's response time is so slow that for the quantities of light required, a mechanical chopper is necessary, the chopper being heavy, noisy, relatively inefficient and in some instances unreliable. In order to achieve major improvements in light triangulation aids for the blind, faster response, higher brilliance, as close as possible to pinpoint type light sources and high sensitivity, low noise photoemission receivers became necessary. In addition, if the light transmission can be made to occur in short bursts instead of going on and off with a 50% duty cycle, an improvement in signal to noise ratio can be anticipated. For equal pulse energies the improvement in signal to noise ratio is proportional to the square root of the duty cycle.

With the foregoing in mind, considerable research has been conducted in an attempt to find pulse light sources of suitable size, spectral output, and power. In the initial investigations numerous types of low pressure glow discharge lamps were studied, including neon and zenon fills and crater and rod, dual rod and flag-type dual rod with auxiliary starting electrodes. These devices are far too cumbersome for placement in a cane and thus proved to be unacceptable to most blind people.

As is well known, in 1963 noncoherent 300° K., GaAs light emitting diodes became available, which due to their small size and easier control and despite the fact that they had a lower conversion efficiency than the zenon filled, flag-type structure discharge lamp, opened the door for a practical tool for the aid of blind people using the optical triangulation principle. Later, when GaAs coherent lasers move from the cryogenic to the room temperature realm, these were put to use successfully, and for the first time in a cane. The most important single advantage of the coherent light emitters, commonly called lasers, is the well collimated beam having a high sensitivity to changing range which is required for reliable detection of small drop offs such as curbs.

DESCRIPTION OF THE INVENTION

In view of the above it is a principal object of the present invention to provide a novel cane for use by persons having impairment of visual acuity, which cane will detect the presence of obstacles in the path of the user.

Still another object of the present invention is to provide a novel cane, as set forth above, which has the "feel" normally associated with the "feel" of a cane normally carried by the blind person commonly known as a "typhlocane."

Still another object of the present invention is to provide a cane having at least one laser mounted in the shank thereof to emit a pinpoint coherent light beam and to receive, in a receiver also positioned on the cane, reflections from an object in the path of the carrier of the cane.

Still another object of the present invention is to provide a second laser transmitter and receiver on the cane which will acknowledge the presence of overhanging devices and warn the carrier of the cane of the presence thereof.

Still another object of the present invention is to provide a third laser transmitter and associated receiver on the cane, which will permit detection of the absence of a surface and the like a set distance from the tip of the cane so as to give warning to the carrier of the cane that he is approaching a dropoff.

Still another object of the present invention is to provide a cane which may be broken down and carried in a convenient manner by the user so as to be more easily stored and inconspicuous in vehicles and on public transportation.

Still another object of the present invention is to provide means for moving at least one of the laser transmitters to permit scanning of objects immediately ahead of the cane carrier and to a limited extent permit range finding.

Yet another object of the present invention is to provide, in conjunction with the above objects, a cane which has been engineered for easy use by the individual without being conspicuous and with negligible weight increase.

Other objects and a fuller under standing of the invention may be had by referring to the following specification and claims taken in conjunction with the accompanying drawings in which:

FIG. 1 is a schematic side elevational view of the cane of the present invention and showing the viewing patterns in which the cane determines obstacles in the path of the carrier;

FIG. 2 is a fragmentary perspective view of the cane shown in FIG. 1 and illustrating its recharging capabilities;

FIG. 3a is a side elevational view of the cane shown in FIG. 2 with portions thereof broken away to illustrate certain features of the cane;

FIG. 3b is a plan view of the cane shown in FIG. 3a and as if the cane were not fragmentized;

FIG. 4 is an enlarged fragmentary sectional view taken along line 4—4 of FIG. 3b;

FIG. 5 is a fragmentary sectional view taken along line 5—5 of FIG. 4;

FIG. 6 is a fragmentary sectional view taken along line 6—6 of FIG. 4;

FIG. 7 is a fragmentary sectional view taken along line 7—7 of FIG. 4;

FIG. 8 is a fragmentary sectional view taken along line 8—8 of FIG. 4;

FIG. 9 is a perspective view of a portion of the apparatus illustrated in FIGS. 4-8 and as removed from the apparatus;

FIG. 10 is a simplified block diagram schematically illustrating the electrical setup employed in one version of the cane of the present invention;

FIG. 11 is a schematic diagram of the power supply, "transmitters, lasers," differentiator, and clamp circuits along with the block diagram of the receivers shown in FIG. 10;

Figure 12:
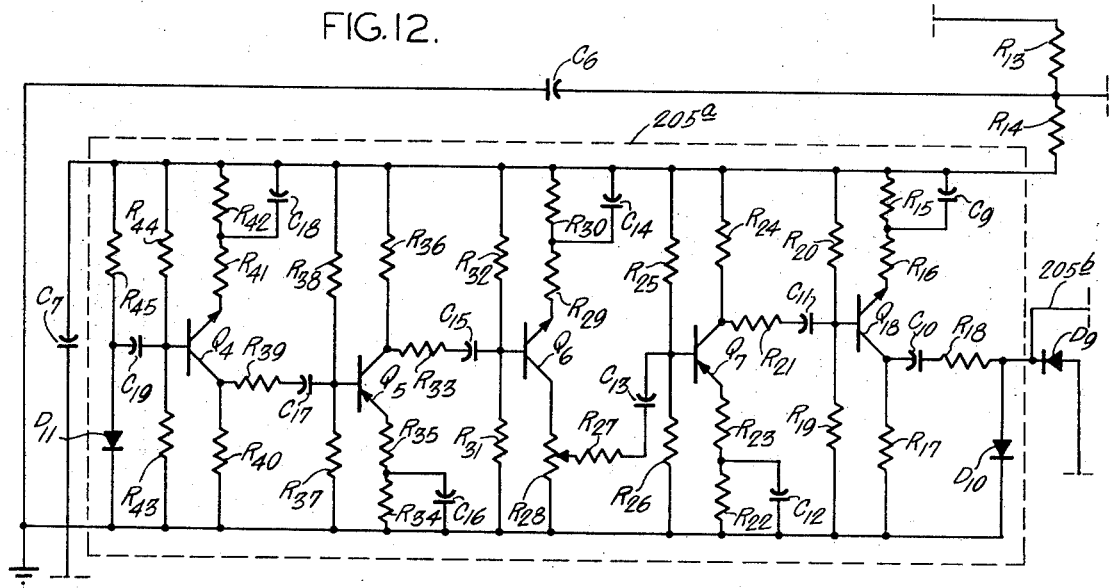
FIG. 12 is a schematic diagram showing one of the receivers illustrated in block form in FIGS. 10 and 11.

Referring now to the drawings, and more particularly to FIGS. 1 and 2 thereof, a novel cane 10, specifically adapted to aid the acumen of persons having impairment of visual acuity is shown therein. In the present instance, the cane 10 includes a crook 11 and an upper and lower shank portion 12 and 13 respectively. An individual, hereinafter referred to as a carrier 14, holds the cane 10 in the same manner as the conventional cane is held by a blind man, that is at an angle of approximately 45° with respect to the ground 15, and forwardly out in front of the carrier so as to sweep a path. The hand of the carrier is conventionally positioned along the upper shank 12 of the cane 10 (see FIG. 1) with the forefinger on the side of the cane and generally parallel to the longitudinal axis thereof.

In accordance with the invention, the cane 10 is provided with light transmitting and receiving means 100 and 200 respectively along with associated circuitry (which will be described more fully hereinafter) which is housed in the upper shank 12 and crook 11 of the cane 10, to indicate to the carrier the presence of an obstacle in his intended path of travel. To this end, the transmitter means 100 includes at least one coherent light source (laser) to emit coherent light in the direction away from the shank 12 and crook 11, and at least one photosensitive sensor to receive reflections of the light when it strikes an object forward of the cane and in the path of the light emitted by the laser. Because it is important for the blind man to know not only when an object is immediately in front of him, but to also know when an object is hanging in a position that could injure his head, such as for example, a tree limb or an awning, or to know of any sudden drops in the pavement, three coherent light sources and receivers are used to see and indicate respectively upper, central and downward obstacles in the path of the carrier. As will appear hereinafter, each of the light sources and receivers are "outwardly" looking with respect to the carrier, and each may be thought of as a channel.

For convenience in discussion, the specification is divided into the mechanical parts of the cane and its operation, and the electrical circuitry associated with the receiver, transmitter and carrier notification of obstacles.

MECHANICAL SECTION

The upper shank 12 of the cane 10, along with the crook 11 is preferably made hollow to house the electronics associated with the transmitting means 100, the receiver means 200, and the carrier notification circuitry. As illustrated in FIGS. 2, 3a, and 3b, the transmitter 100 includes an upper optics housing 101 located adjacent the crook 11, and mounted so as to project outwardly away from the upper shank 12. As shown in FIG. 3b, the upper optics housing includes an outer sidewall 101a which is preferably mounted laterally offset from the common plane of the shank and crook but parallel thereto, so that the sidewall acts as a locating surface for the index finger of the carrier 14. Of course, if the carrier is left handed, the housing may be moved to the left side of the cane to act as an indicator for the left index finger.

As shown in FIG. 3a, the upper optics housing 101 includes three channels, in the present instance, an upper, lower, and central looking recessed lens 102, 103 and 104 respectively which lenses are positioned to permit coherent light to pass therethrough from a laser 105, 106 and 107 each associated with a lens. As shown in FIG. 3a, the laser 105 is associated with the upward "looking" lens, the laser 106 is associated with the downward "looking" lens 103 while the laser 107 is associated with the central or outwardly and forwardly "looking" lens 104. In a like manner, a lower optics housing 201 houses the light receiving means 200, the receiving means including a recessed focusing lens 202 and an associated sensor, in the present instance a photocell 205, a downward focusing lens 203 and an associated photocell 206, and a central focusing lens 204 having a photocell 207 associated therewith.

Because of the use of a pinpoint source, such as a laser, the lenses may be conventional, and the mounting for both the lasers 105–107 and the photocells 205–207 may be such as to permit adjustment thereof relative to their associated lenses so as to fit the needs of the individual user. To this end, both the lasers 105–107 and the photocells 205–207 are mounted on brackets 108, 208 respectively. Each of the lasers and photocells is adjustable in both the image plane and along the optical axis of its associated lens by the provision of a slot 109, 209 in the brackets 108, 208 and a screw 110, 210. Thus, as will be more fully explained hereinafter, the adjustment of the photocells will permit movement of the fan-shaped shaded areas shown in FIG. 1, so that scattered reflections may be more easily received and so that adjustment may be tailored to the individual user.

In accordance with one feature of the invention, the central looking coherent light, including the laser 107 and lens 104, is made movable, at least in the plane of the longitudinal axis of the cane (i.e. in the vertical plane when being held in walking position) so that the effective range of the outward and forwardly looking laser may be adjusted to meet varying conditions such as in crowded areas or in more spacious areas, to permit limited ranging of the coherent light beam by the carrier. To this end, the laser 107 and the lens 104 are mounted in a casing 111 which is arcuately movable about pivot pins 112 connected to the wall of the cane 10 (See FIGS. 5–9). In order to effect rotation of the casing 111 about the pivot 112, and as best shown in FIG. 9, connected to the casing 111 is an offset block 113 having an arm 114 extending outwardly therefrom and extending longitudinally of the shank 12. As illustrated, the arm 114 includes a slot 115 while the block 113 contains a slot-shaped aperture 116 through which passes an actuating rod 117 carrying a radially projecting pin 118 at one end thereof adapted to ride in the slot 115 of the arm 114. As shown in FIG. 6, the rod 117 is supported for movement axially of the shank 12 by a support block 119, connected to a wall of the shank 12, and containing a bore 120 through which the rod 117 extends. The opposite end of the support block 119 is radially offset as at 119a and contains a groove or track 121 in which the pin 118 rides upon reciprocation of the rod 117 through the bore 120. From the foregoing it will be appreciated that reciprocation of the pin 118 by the rod 117 causes the arm 114, connected to the casing 111, to rotate the casing 111 about the pivot 112. For example, when the actuating rod 117 moves to the right, as viewed in FIGS. 4 and 6, the pin 118 moves to the right in track 121 of the support block 119 causing the arm 114 to be raised effecting counterclockwise motion to the casing 111 about the pivot 112.

In order that the carrier 14 may easily effect a vertical sweeping motion of the laser 107 and its associated lens 104, while retaining a feel for the relative position of the pulsed beam of coherent light from the laser, actuating means are provided in such a manner that the carrier may effect such sweeping with the same hand used for carrying the cane while maintaining this hand in the carrying position on the cane (see FIGS. 1 and 2). To this end, an arcuate slot 122 is positioned adjacent the optical housing 101 and permits a shaft 123, having a knob 124 at the outer end thereof, to pass through the slot 122 As illustrated best in FIGS. 5–8, the shaft 123 is connected to a yoke 125 which is freely rotatable about the actuating rod 117, but axially restrained against relative axial movement relative to the actuating rod 117, by the restraining washers 126. As may be seen in the drawings, as the slot 122 extends axially as well as radially of the shank 12, it acts as a cam thus facilitating the longitudinal movement of the actuating rod 117 relative to the shank permitting the vertical plane adjustment of the laser 107 and its associated lens 104 as desired. In addition, the arc of the slot 122 is cut in such a manner that while the carrier is holding the shank 12 of the cane 10 his thumb may engage the knob 124 of the actuating means and a simple thumb movement will permit the sweeping motion, above described.

Although the electronics will be more fully described in the following section, as may be noted in FIG. 4, an on-off switch 127 may be aligned axially with the actuating rod 117 so that when the actuating means is all the way down, i.e. farthest to the left as shown in FIG. 4 the actuating rod 117 will contact the spring-loaded button 128 of the switch 127 and shut off the electronics of the cane. Thus when the actuating rod 117 moves away from the button 128, the electronic circuits (later to be described) will be switched on.

The areas covered by the three optical probes or lasers 105–107 and associated lenses 102–104 as well as the receiver 200 is illustrated in FIG. 1. The projected beam of coherent light from the upper channel or upward looking channel (i.e. laser 105 and lens 102) is designated 105a, the projected beam of coherent light from the downward looking channel (i.e. laser 106 and lens 103) is designated 106a, and the upper and lower arcuate ranges of the coherent beam of light emitting from the central or forward looking channel (i.e. laser 107 and lens 104) are designated 107a and 107b. The fan of permissible received light from the lasers is shown in hatched lines and indicates the areas in which, if an object is positioned, the reflected light will be returned to the associated receiver. For example, the upper channel receiver associated with the photocell 205 and lens 202 has a fan of reception generally designated 205a, the downward channel receiver associated with the photocell 206 and lens 203 has a fan of reception designated 206a, and the central channel receiver associated with the photocell 207 and lens 204 has a fan of reception designated 207a. The word "fan" is used to describe the areas of reception because each area has substantially planar vertical sidewalls with very little divergence between the walls, the fan being generally pie-shaped.

It should be noted that it is possible to scan rather accurately in order to delineate the edges of objects detected, by turning the cane about its longitudinal axis. For information purposes, the projected beam for each channel is approximately ½ degree. Thus at 10 feet the beam is about 2 inches long and ½ inch high. As may be appreciated, while the presence of an obstacle is necessary in order for the operation of the upper and central looking transmitter and receiver channels, the lower looking channel is keyed to indicate the absence of an object, which absence indicates an obstacle in the form of a dropoff or the like immediately in front of the carrier. Thus the downward looking channel, when the path ahead is solid and unbroken, gives no warning to the user because light is reflected back from the unbroken surface into the receiver. Alternatively, if the carrier is approaching a curb, such as the curb 30 shown in FIG. 1, it is easily seen that light reflection does not come back to the receiver in the cone 206a and, as will be more fully explained hereinafter, the carrier is warned of an impending dropoff.

Surprisingly, many blind persons consider the lower or downward looking transmitting and receiving channels to be the most important because of the seriousness of failure to detect an obstacle at the foot level in the path of the carrier, especially if the obstacle is a downgoing stair flight, the edge of a train platform, or an open manhole. Of course the blind traveler rarely misses such a hazard anyway because when confronted with unknown areas he tends to travel more slowly, and therefore he discovers such an obstacle with his cane tip.

The range of the downward looking channel is set so that it will indicate an obstacle, or the lack of an object, at approximately 5½ feet from the forward foot of the carrier, or approximately 3 feet from the tip 31 of the cane 10 which allow approximately 2 steps warning, assuming that the cane is held at the normal can carrying angle from the ground 15, i.e. 45°. When held in this way, a minimum dropoff of approximately 6 inches is detectable. However, this requires a very careful cane carrying technique since lifting the cane off the ground or altering the carrying angle will produce a false alarm. For this reason, and as will be more fully explained hereinafter, a sensitivity control is included in order to allow adjustment of detection sensitivity and consequent easing of carrying posture in certain instances where this is deemed advisable.

The straight ahead, or central channel is technically capable of detecting most objects as far away as 18 feet or more. However, most carriers do not find it desirable to "see" more than 12 feet ahead since there is no need to alter course sooner than this. In addition, in crowded or cluttered situations, most carriers would prefer to detect only one pace ahead (30 inches ahead) so the adjustment means associated with the laser 107 permits changing the angle of projection of the transmitted light so as to adjust maximum range of detectable objects from 12 feet down to the cane tip.

The straight ahead channel is also useful for other purposes besides finding obstacles in the path of the carrier. For example, when walking down a narrow corridor, if the cane is rotated slightly along its axis, from side to side, the walls will be perceived. In actual practice this technique has been used effectively to keep a straight course. Similarly, a building or fence located on just one side of the intended path of travel, may be perceived and followed. In addition, the straight ahead channel is also useful for searching for known landmarks such as mail boxes, barber poles, lamp posts, etc.

The upward looking channel as defined by the laser 105, associated lens 102, and receiver including photocell 205 and associated lens 202 appears to give, at least to some blind people the most important information of all. The reason for this is that the upward looking channel covers an area that otherwise remains completely unprotected from such overhangs as tree branches, awning supports, low hanging signs and the like which, although infrequent, are quite unpredictable hazards to the blind person. As may be seen in FIG. 1, the upward looking channel is designed to cover from about 4 feet to 6 feet above the ground in a plane which begins and is substantially perpendicular to the ground at the tip of the cane. Initially, the channel had been designed to give a greater or longer distance warning, but this was found to be confusing to some carriers and, since on the few occasions when such an obstacle is encountered it is just as easy for the carrier to duck, stop or raise his other hand, the excessive prewarning was changed so that the carrier will perceive only those obstacles immediately overhanging ahead. The limit of sensitivity of this channel is such that a dark colored wire or clothes line can just be detected.

It is recognized that the blind traveler can perambulate satisfactorily without an electronic cane. The distant warning features simply make it easier to train the newly blind and make walking somewhat more relaxed for persons more accustomed to their lack of vision. Thus, it is important that the electronic cane function satisfactorily as a cane as well as an obstacle detection device. For example, if the cane is too heavy, if it reacts in a peculiar fashion when used as a probe, or if it looks peculiar when in use the cane will not be used. Thus major attention is focused on achieving low weight and good balance as well as ease of transport when not in use.

To this end, the upper shank portion 12 and crook 11 is preferably constructed of a light metal such as magnesium, the batteries and other relatively heavy components are mounted in the crook 11 to move the center of gravity up the cane to a position located as near as possible to the crook. Thus the tubular upper shank 12 of the cane 10 is made to contain the electronics, especially positioned to avoid cross talk and other problems, while the lower shank portion 13 may be made of any material that will help duplicate the feel of the conventional long cane.

At this point it should be noted that the lower shank portion 13 is easily removable to permit ease in storage and transport as well as to permit varying length shanks to be used in accordance with the height of the carrier. To this end, and as may be seen in FIGS. 3a and 3b, the lower shank portion is tubular having a rounded or curved tip 31 and a reinforcing sleeve 32 pressed into the upper end of the tube. The shank 12, on the other hand, has a projecting nipple 33 and axially spaced radially positioned grooves 34 adapted to receive O-rings 35 therein. The O-rings, upon insertion of the nipple 33 into the sleeve 32, engage the sleeve and give a good friction fit holding the lower shank portion 13 in position.

Although either magnesium or aluminum may be used for the lower shank portion 13, magnesium is too springy while aluminum is somewhat heavier than is desirable. In order to reduce "whip" and at the same time obtain other attributes, the required material should have a high modulus of elasticity, a low density, and a high ultimate yield because of the danger of breakage when the cane inadvertently sticks in a grating or gets caught in some other obstacle. One such material which has been found extremely useful and meets the requirements outlined above is a plastic laminate developed for aerospace use. The plastic laminate may be a fiber glass reinforced epoxy resin in which glass fiber or other substrate is coated with a thin layer of boron. The specifications of the material outlined above and used as the lower shank portion 13 of the cane 10 is that the material has a modulus of elasticity of about $60 \times 10^6$ as compared to approximately 15 for conventional fiber glass reinforced epoxy, 30 for steel, 12 for aluminum in the grade used in present canes and 10 for magnesium in readily available alloy form. The density was low while the weight of the cane became approximately 10% lighter and an estimated 6 times stiffer than the most suitable magnesium tube. In addition, as the material may be cast or molded, a taper may automatically be formed to help shift the center of gravity upward away from the tip 31 which, of course, helps to raise the overall balance position of the cane.

ELECTRONIC CIRCUITRY

In order to obtain a better understanding of the operation of the circuitry associated with the lasers and coherent light sensors, the block diagram of FIG. 10 is presented. As illustrated, the solid lines with arrow heads indicate output signals between the blocks, while dotted lines indicate the feeding of power from a power supply 50 to various component parts, hereinafter described.

The operation of the circuitry, in brief, is as follows: upon the switch 127 being released, current from the power supply 50 flows to the transmitter lasers 100, clamp 150, receivers 200, multivibrators 250, and stimulators 300. Upon energization of the laser transmitters, a coherent light is pulsed outwardly away from the cane as by the lasers 105–107, at a rate of approximately 40 pulses per second. A portion of the pulse from the trigger circuit for pulsing of the lasers (hereinafter described) is fed to the clamp 150 which opens the clamp 150. As may be seen, the clamp 150 is connected to ground as at 151 and to each of three outputs 205b, 207b, and 206b respectively emanating from three separate receivers 205a, 207a, and 206a associated with photocell sensors 205–207. The opening of the clamp 150 prevents an output from any of the receivers from being shunted to ground, allowing an output signal, from an amplifier to trigger one of three separate multivibrators of the one shot variety, 251, 252, and 253.

As the downward looking receiver 206a is the only receiver which will normally receive a light reflection from the laser transmitter 106, it is preferable that a signal emanate to warn the carrier only in the absence of reflecting surface in his path. To this end, a portion of the trigger signal is differentiated in a differentiator 170 and the signal emanating therefrom is used in conjunction with the signal 206b to prevent the multivibrator 253 from oscillating. Thus, as will be seen hereinafter, the signal 170a from the differentiator 170 is used to set (turn on) the multivibrator 253, while the presence of a signal 206b will reset (turn off) the multivibrator 253. Upon actuation of one or the other or all of the multivibrators 250, signals 251a, 252a, and/or 253a will emanate from the multivibrators and enter into separate stimulator circuitry 301, 302, and 303 respectively. Because the great majority of objects which will be perceived will be those seen by the forward looking channel, the stimulator associated therewith is one of feel rather than tone, while the stimulators 301 and 303 are audible in type.

More specifically, and referring now to FIG. 11, the power supply 50 is shown enclosed in the dotted lines wherein the switch 127 is illustrated schematically as being connectable between a charging socket 128 (when the switch 127 is in the off position) and in the position shown for providing battery power to the various parts of the circuit. In the present instance the battery power supply comprises ten nickel cadmium cells of the button nominally rated at 1.2 volts apiece. As noted, the power supply 50 includes a ringing choke converter which converts the 12 volts D.C. to A.C. the transistor $Q_1$ acting as an oscillator, the voltage of which is stepped up by the transformer $T_1$ and rectified, by a diode $D_1$. The design of the converter is conventional and a good discussion of the design of the transformer and the associated circuitry may be found on page 58 of: "A Report on the Design, Manufacture and Laboratory Testing of the Veterans Administration Obstacle Detector Model G–5," reference being had to the Veterans Administration Department of Medicine and Surgery and the work done under contract Number V1005P–9217. The high voltage output of the secondary of the transformer $T_1$ is rectified to approximately 600 volts D.C. for operation of a trigger generator comprising the transistor $Q_2$ and its associated circuitry which is coupled to a pulse driver and then to the lasers 105–107.

The operation of the trigger generator is that the 600 volts D.C. from $D_1$ charges up capacitor $C_2$ through a high resistance $R_5$ until the transistor $Q_2$ avalanches at which time the capacitor $C_1$ discharges through the avalanched transistor and through a low value resistor $R_6$, producing a trigger pulse across $R_6$. Part of this trigger pulse is picked off and integrated by $R_9$ and $C_4$ and fed to clamp 150 to open transistor $Q_3$ by biasing the base of the transistor $Q_3$ to the off or nonconductive mode. Another portion of the trigger pulse is used to trigger a pulse driver comprising an SCR (silicon controlled rectifier) which serves as a low impedance switching path for the capacitor $C_3$, which capacitor is discharged through the lasers 105–107 causing the lasers to fire.

It should be noted that the values of $R_5$ and $C_2$ are chosen to give a pulse repetition on the order of 40 pulses per second, or a cycle of 25 miliseconds duration. On the other hand, the pulse duration is only 100 nanoseconds which means that the duty cycle is only $\frac{1}{250,000}$.

As shown, a portion of the pulse discharge through the lasers is differentiated by the differentiator 170 which comprises the capacitor $C_5$ and Resistor $R_8$, and feeds an output 170a through the resistor $R_{10}$ and diode $D_5$.

Each of the receivers 205a, 206a, and 207a are identical, and include the sensors 205, 206, and 207 heretofore described as part of the receiving means 200. Because of the identicalness of the receivers, only one of the receivers need be shown and thus for purposes of discussion the diode $D_{11}$ of FIG. 12 may assume the position of any of the sensors 205–207. At this point it is well to recognize that the sensing diode or sensor will preferably be of a special geometry having a junction which permits the fan-shaped reception heretofore described with reference to FIG. 1. These special diodes may be ordered from Philco Co. and have a part number of SP–015–471. Briefly, the diodes have a rectangular junction which is oriented lengthwise in the axis parallel to the longitudinal axis of the cane in order to achieve the fan-shaped areas of reception shown in FIG. 1.

As is shown in FIG. 12, the silicon photodiodes $D_{11}$ are reverse biased so that they operate in the photoconductive mode. Each of the diodes feeds a five stage pulse amplifier, the stages of which are complementary and have a low level bias in their quiescent or non-active state. Thus the stages of the amplifier are preferably biased class AB with an unconventionally large, by-passed emitter resistor, i.e. the ratio of emitter to collector resistance being preferably high, on the order of 12:1. Ideally, the amplifier would preferably pass only the 100 nanosecond pulses and reject anything below or above as far as frequency is concerned. Of course, as this as a practical is difficult to obtain without undue expense, and as the most difficult interference problem that is encountered is that of fluorescent lights, the amplifiers have a low frequency rolloff below 100,000 c.p.s. (i.e. large ratio of emitter to collector resistance) which excludes amplification of undesirable pulses, which pulses might otherwise trigger the stimulator circuits 300 herein described.

Each of the amplifiers has an output, above designated 205b–207b, which has a shunt path designated 152 in FIG. 10, comprising reverse biased diodes $D_7$–$D_9$ which serve to shunt spurious signals, from the output of the amplifiers, to the clamp 150 thus grounding undesirable signals through the normally conductive transistor $Q_3$. On the other hand, as has heretofore been described, upon the clamp receiving a signal from the trigger generator, $Q_3$ is switched off and thus the ground path is opened and the signal received, if any, is fed to the one shot multivibrators 250. At this point it is desirable to note that each amplifier is provided with a gain control $R_{28}$ which permits adjustment of the sensitivity of the amplifier to satisfy the requirements of individual users. The most sensitive channel, of course, to reception is the lower or downward looking channel which is somewhat critical with regard to the angle at which the cane is held. The sensitivity control for the lower channel may be set either by the user in the field, or even by providing a separate knob located on the exterior of the cane to permit adjustment by the carrier while he is walking.

Figure 13:
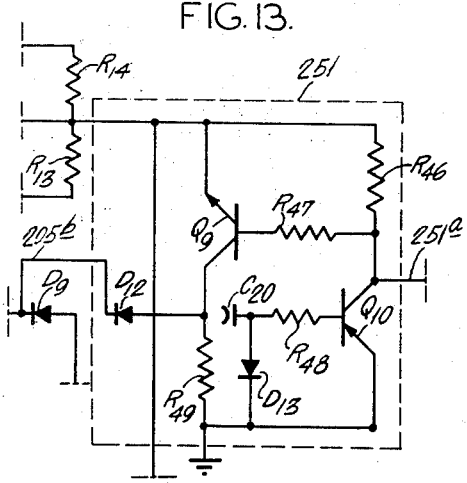
FIG. 13 is a schematic diagram of the multi-vibrator circuit associated with the upward looking and outward looking channels.

Thus production of a pulse by the trigger generator ($Q_2$) opens the clamp 150 permitting pulses from the receivers 200 to reach the input of the monostable or one shot multivibrators 250. As the multivibrators are substantially the same, at least the multivibrators 251 and 252 associated with the upper and central looking channels, a single multivibrator is illustrated in FIG. 13, the particular one shown being for the upper looking channel and is designated 251, although it should be recognized that the multivibrator 252 is identical.

To this end, and in the quiescent mode before receiving an input 205b from the amplifier 205a, transistors $Q_9$ and $Q_{10}$ are biased off, and upon receipt of a negative signal 205b, the collector of $Q_9$ and the base of $Q_{10}$ receives the signal (the latter through $C_{20}$ and $R_{48}$) causing $Q_{10}$ to turn on which causes the collector of $Q_{10}$ to go positive turning on $Q_9$ through its base resistor $R_{47}$. Capacitor $C_{20}$, which is large, charges until the current through $R_{48}$ to the base of $Q_{10}$ is no longer sufficient to sustain $Q_{10}$ in the on condition thus causing $Q_{10}$ and therefore $Q_9$ to turn off, the circuit then having reverted to its quiescent condition.

It is noted that the on period of the multivibrator is set by the time constant of $C_{20}$, the input impedance of $Q_{10}$ and the resistor $R_{48}$. Thus, it is a simple matter to adjust the resistor $R_{48}$ in order to obtain the desired on time of the vibrator. The preferable on time of the vibrator, in the present instance, is approximately 12.5 milliseconds, which is 50% of the pulse repetition cycle duration.

Figure 14:
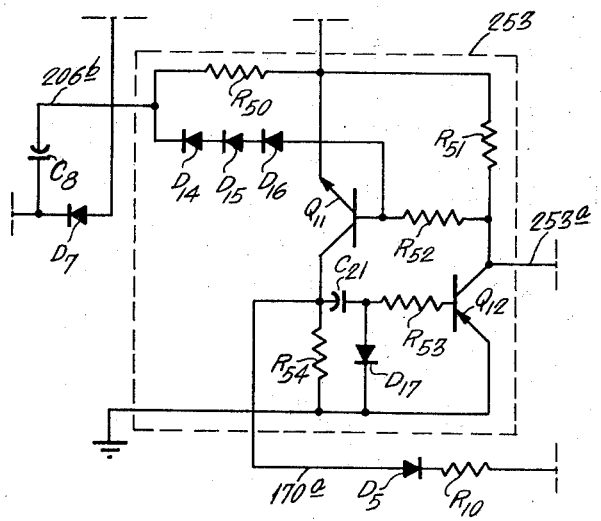
FIG. 14 is a schematic diagram of the multi-vibrator used for the lower or downward looking channel.

As noted above, when an obstacle is in the path of the downward looking channel (i.e. the lack of an object) a warning must be given to the carrier indicating the absence of an object. As each of the amplifiers or receiver circuits are similar to the one shown in FIG. 12 and above described, the absence of a signal 206b (see FIGS. 10 and 14) should permit the triggering of the multivibrator 253 rather than the presence of a signal. To this end, the differentiator 170 (see FIGS. 10 and 11) feeds a signal 170a into the collector circuit of the transistor $Q_{11}$. As may be noted, the circuitry associated with $Q_{11}$ and $Q_{12}$ is identical in most respects to the circuitry associated with $Q_9$ and $Q_{10}$ in the multivibrator 251 of FIG. 13. Thus operation of the multivibrator 253, upon being fed the signal 179a, is identical to the operation of multivibrator 251. However, immediately upon the signal 170a turning on the multivibrator, the signal 206b which indicates the amplifier 206a has reveived a return, resets the multivibrator and prevents it from giving an output 253a. On the other hand, when an obstacle appears (i.e. the lock of an object or no return from the laser 106) no signal 206b is emanated and the on signal 170a for the multivibrator is not overridden.

Because the central or forward looking channel is the channel most likely to receive a reflection from an object in the path of the carrier, the means for indicating the presence of an obstacle to the carrier is preferably of the tactile type as opposed to the auditory type. To this end, the output signal 253a from the multivibrator 252 (identical to the multivibrator 251 described with reference to FIG. 13) couples directly to the base of a transistor $Q_{13}$ which is directly coupled to a driver transistor $Q_{14}$ connected to a tactile stimulator 305, causing the stimulator to be excited. A stimulator similar to he one uilized herein is illustrated in FIGS. 5 and 6 of the Benham et al. Pat. No. 3,198,952. Suffice to say that the tactile stimulator 305 includes a poker 306 which projects through the casing of the shank 12 in a position adjacent the upper optics housing 101. As best shown in FIGS. 2 and 3a, the poker 306 is positioned so that it stimulates the forefinger upon receipt of information that an obstacle is in the path of the carrier of the cane.

Figure 15:
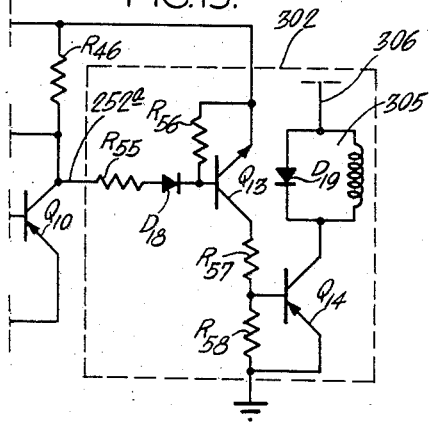
FIG. 15 is a schematic diagram of the output of the central looking channel and its stimulator.
Figure 16:
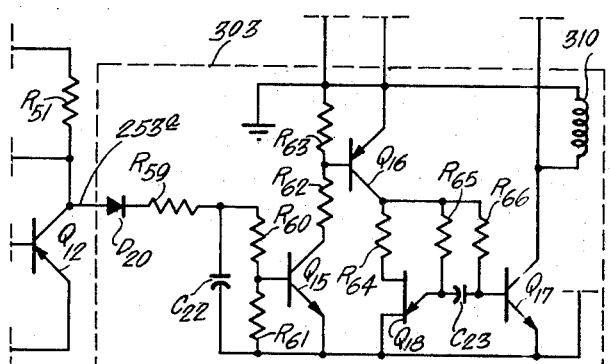
FIG. 16 is a schematic diagram of the low or high stimulator output from the low or high channels.

On the other hand, the notification of an obstacle, received from the upper channel and lower channels, although capable of being handled by a separate stimulator such as described with regard to FIG. 15, is just as easily given by an audible tone as such obstacles infrequently occur. As the circuitry for both the upper and lower channels are the same with the exception of a single capacitor which determines the tone frequency, the circuit of the lower channel is briefly described hereinafter with reference to FIG. 16. The signal 253a coming from multivibrator 253 (described with regard to FIG. 14) couples to the base of a transistor $Q_{15}$ which, through its collector is coupled to a complementary transistor $Q_{16}$, the transistor pair serving as a power driver for an oscillator comprising uni-junction transistor $Q_{18}$ and transistor $Q_{17}$ along with resistors $R_{65}$, $R_{66}$, and capacitor $C_{23}$. In order that the tone generated may be audible, the output of transistor $Q_{17}$ is directly coupled to a piezoelectric transducer 310 which, as illustrated in FIG. 2 is located at the end of the crook 11. As will readily be understood, if the value of $C_{23}$ is increased, i.e. the capacitance increased, the frequency output will be lowered, while if the capacitance $C_{23}$ is lowered, the frequency will be raised.

In order that the pulse duration from the multivibrator stage, which is only 12.5 milliseconds, be increased because this is of insufficient duration for an individual to be sure that he has heard a tone at all, to about ⅕ of a second or slightly longer, the 12.5 millisecond pulse 253a is integrated by the capacitor $C_{22}$ and resistor $A_{59}$.

The following table lists values of components actually used in one embodiment of the circuits shown in FIGS. 11–16.

Resistors (ohms):
    $R_1$—3.9K
    $R_2$—51
    $R_3$—220
    $R_4$—27K
    $R_5$—10M
    $R_6$—10
    $R_7$, $R_{49}$, $R_{54}$, $R_{57}$—4.7K
    $R_8$, $R_{10}$, $R_{11}$, $R_{17}$, $R_{18}$, $R_{24}$, $R_{28}$, $R_{36}$, $R_{40}$, $R_{45}$, $R_{50}$—1K
    $R_9$, $R_{55}$, $R_{58}$, $R_{62}$—47K
    $R_{12}$, $R_{27}$, $R_{65}$—22K
    $R_{13}$—22
    $R_{14}$—47
    $R_{15}$, $R_{22}$, $R_{30}$, $R_{34}$, $R_{42}$, $R_{59}$—12K
    $R_{16}$, $R_{23}$, $R_{41}$—33
    $R_{19}$, $R_{25}$, $R_{26}$, $R_{31}$, $R_{38}$, $R_{43}$, $R_{56}$, $R_{60}$, $R_{61}$, $R_{63}$—100K
    $R_{20}$, $R_{32}$, $R_{37}$, $R_{44}$—120K
    $R_{29}$, $R_{66}$—33K
    $R_{21}$, $R_{33}$, $R_{39}$—2.2K
    $R_{35}$—38
    $R_{46}$, $R_{51}$—3.3K
    $R_{47}$, $R_{52}$—330K
    $R_{48}{}^1$, $R_{53}$—10K
    $R_{64}$—470

Capacitors (MF, unless otherwise indicated):
    $C_1$, $C_6$, $C_7$—100
    $C_2$, $C_{23}$—.02
    $C_3$—.04
    $C_4$—330 pf.
    $C_5$—100 pf.
    $C_8$, $C_{10}$, $C_{11}$, $C_{13}$, $C_{15}$, $C_{17}$, $C_{19}$—.01
    $C_9$, $C_{12}$, $C_{14}$, $C_{16}$, $C_{18}$, $C_{20}$, $C_{21}$, $C_{22}$—.47

Diodes:
    $D_1$—1N3282
    $D_2$, $D_3$, $D_4$—C141D FMP1000
    $D_5$–$D_{10}$, $D_{12}$–$D_{20}$—TI10
    $D_{11}$—$^1$ Transistors:
    $Q_1$—2N597
    $Q_2$—2N2540
    $Q_3$, $Q_{10}$, $Q_{12}$, $Q_{14}$, $Q_{16}$—2N3640
    $Q_4$, $Q_6$, $Q_8$—2N4104
    $Q_5$, $Q_7$—2N2605
    $Q_9$, $Q_{11}$, $Q_{13}$, $Q_{15}$, $Q_{17}$—40221
    $Q_{18}$—5E35

Lasers (105–107) G.E. H1D1.

$^1$ See text.

Figure 17:
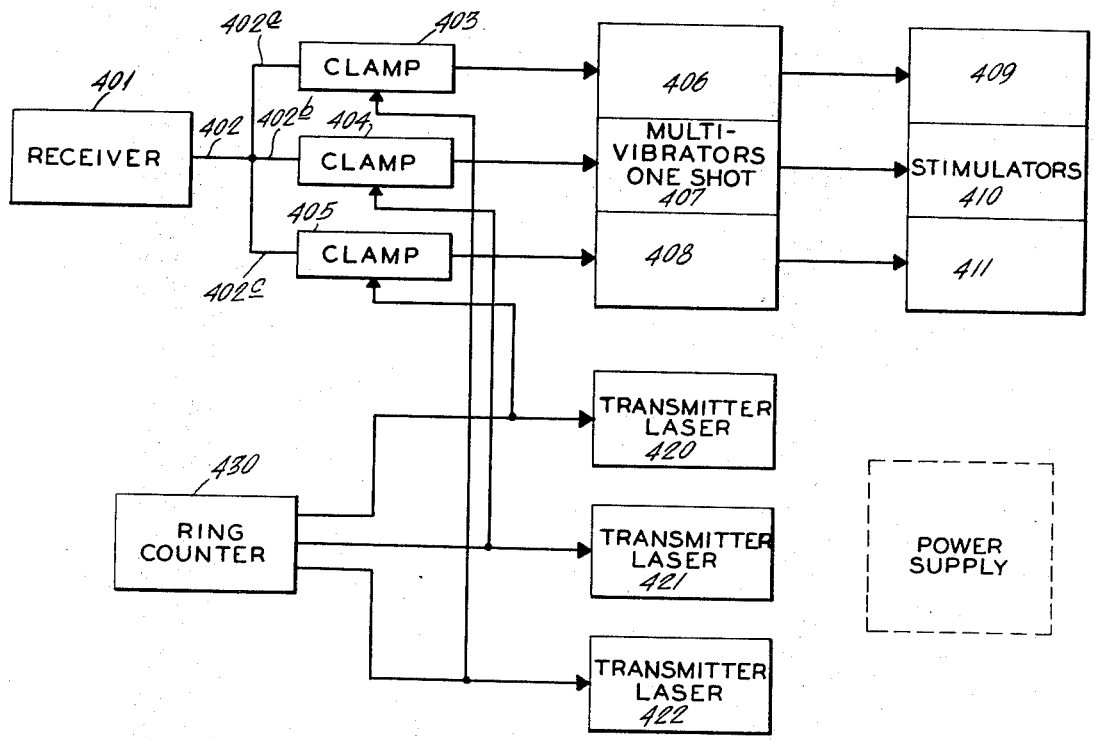
FIG. 17 is a schematic block diagram of an alternate electrical system.
Figure 18:
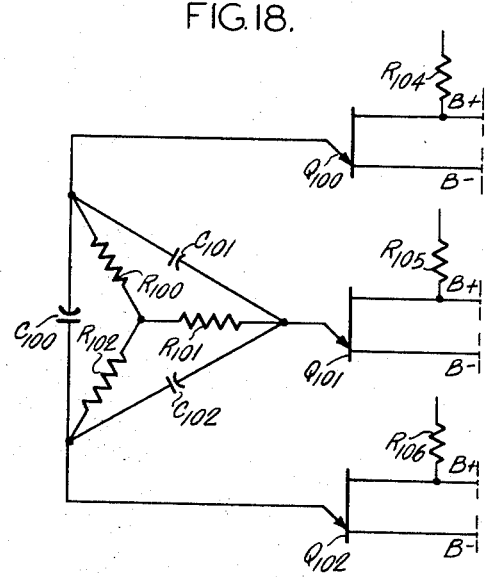
FIG. 18 is a typical trigger ring counter which may be used in conjunction with the circuit block diagram of FIG. 17.

A variation of the electronic scheme heretofore set forth is shown in FIGS. 17 and 18 in which the lasers 105–107 may be operated separately but in independent synchronism with one another. A system of this nature requires only one receiver amplifier instead of three receiver amplifiers, although three photocells such as the photocells 205–207 would be required. In addition, a system such as that block diagramed in FIG. 17 would require separate clamping circuits for each of the ring counter outputs so that the clamps would be opened synchronously (clamps normally shunt signal to ground) for permitting light reflected from an object and received by the receiver to trigger one or the other of the one-shot multivibrators, dependent upon whether or not the ring counter signal had opened the clamp. Although not shown in the block diagram of FIG. 17, in a manner such as has heretofore been described relative to FIG. 10, if it is desired that the lower looking channel be activated only upon the lack of perception of an object in the path of the carrier, a differentiator may be included intermediate the transmitter and the lower channel multivibrator to initially set the lower multivibrator while the ring counter acts to set the clamp.

Referring more specifically to FIG. 17, a receiver 401 similar to the receiver of FIG. 12, includes three photocell diodes having an output 402 which is split into signals 402a, 402b, and 402c fed respectively into clamps 403, 404, and 405. The clamps 403–405 may be similar to the clamps 150 shown in FIG. 11. The output of the receiver 401, if permitted to pass through one of the clamps will trigger one of three multivibrators 406, 407, and 408 depending upon whether the associated clamp is open. The multivibrators 406–408 may be similar to the multivibrators shown in FIGS. 13 and 14 as desired. In addition, the stimulators 409, 410, and 411, illustrated in the block diagrams, may be similar to the stimulators shown in FIGS. 15 and 16 and as heretofore described. The transmitter section 420, associated with the lasers are preferably separate, and comprise separate pulse drivers as heretofore described. In this case, each of the laser transmitters 421, 422, and 423 would have its own pulse driver, and, unlike the lasers 105–107 shown in FIG. 11, would not be operative in series but rather separately and as independent units.

In order to operate the laser transmitters separately but in alternating synchronism, three separate trigger generators are required, which may be povided by a ring counter 430 such as block diagramed in FIG. 17 and as schematically shown in FIG. 18. The ring counter comprises the resistors $R_{100}$, $R_{101}$, and $R_{102}$ and the capacitors $C_{100}$, $C_{101}$, and $C_{102}$ triggering respectively and in alternating synchronism the uni-junction transistors $Q_{100}$, $Q_{101}$, and $Q_{102}$ in a manner well known to the art. Typical values for the resistors $R_{100}$–$R_{102}$ are 6.8K ohms, while typical values for the capacitors $C_{100}$–$C_{102}$ are .68 microfarad.

If a ring counter is used, it may be advisable to replace the silicon controlled rectifier of FIG. 11 with a silicon transistor designed to be operated in the avalanche mode.

Although the quantity of light emission by the lasers may be relatively high, it is possible to cut down this quantity of light without adversely effecting the efficiency of the cane by replacing the G.E. H1D1 lasers with a lower output laser, such as the RCA 2628. The inherent advantage of using this lower output laser is that the G.E. lasers require 60 to 65 amperes of threshold current for laser action while the RCA laser type (above-identified) requires only 10 to 15 amperes of instantaneous threshold current. Thus, as the current requirements of firing the lasers in independent synchronism is greater than in series, (FIG. 11) the lower current lasers would be preferable.

Thus the cane of the present invention provides a hand held walking aid for those persons having impairments of their visual acuity, which cane, while retaining the balance of the walking cane normally used by the blind, gives the additional advantage of enabling a blind person to "see" obstacles in his path both overhead, straight ahead, or on the ground.

Thus although the invention has been described with a certain degree of particularity, it should be understood that the present disclosure is only exemplary of the invention, and that numerous changes in the details of construction, and the combination and arrangement of parts may be made without departing from the spirit and scope of the invention as hereinafter claimed.

What is claimed is:
1. A sensing device for use by the blind comprising
   a typhlocane having an extended body and a hollow upper portion for internally housing mechanical and electrical parts,
   a plurality of light emitting sources supported by said typhlocane substantially within a common plane, including the long axis of the cane, and divergently directed,
   a similar number of light receiving elements supported by said typhlocane and each positioned to receive light reflected by surfaces illuminated by one of the light sources,
   energy source means for the light sources and circuitry connecting the light sources and the energy source means and causing the light sources to be pulsed on for a brief time at regular intervals,
   stimulator means to inform a user of obstacles of different types, and
   circuitry responsive to the light receiving elements to actuate the stimulator means, the energy source means and the circuitry being located as high as possible in the hollows of the upper cane and, to the extent possible, in and above the part normally grasped by the user in order to achieve a cane whose balance makes it suitable for mechanical use.

2. The sensing device of claim 1 in which the light emitting sources are solid state lasers which are pulsed on for a brief time at regular intervals.

3. The sensing device in accordance with claim 1 wherein said extended body is divided into an upper and lower portion, one of said portions having a nipple, and the other of said portions having a socket, at least one resilient O-ring on one of said socket or said nipple, said socket and said nipple being dimensioned for coacting frictional engagement by said at least one O-ring and having solid contact between the parts in at least one location to permit transmission of vibrations.

4. The sensing device of claim 1 in which the bottom half of the cane is of rigid but light construction.

5. The sensing device of claim 1 in which at least one of the light emitting sources is directed downwardly and has its associated stimulator and circuitry so connected that the stimulator is actuated only in the event that there is no reflection into the light-receiving element normally due to a discontinuity in the walking surface.

6. The sensing device of claim 1 in which at least one of the light emitting sources and its associated light receiving element is directly upwardly to detect an obstacle above the ground and not extending immediately in front of the sensing device in the direction it is being moved, and in which the stimulator is responsive to reflected light.

7. The sensing device of claim 1 in which one light source is directed generally horizontally directly ahead and in which means is provided to adjust the relative positions of the light source and light-receivng element in order to change the range at which the combination will be effective, and in which the stimulator is responsive to reflected light.

8. The sensing device of claim 7 in which a mechanism generally accessible to the hand of the user holding the cane at its upper end is provided to permit adjustment and measurement of the range without removing the hand from the cane to provide a measurement of range to the sensed object.

9. The sensing and ranging device of claim 8 in which it is the light emitting source which is adjusted by movement of a finger actuated element in a slot.

10. The sensing device of claim 9 in which a light source is pivotally supported and connected by a linkage to a translational element whose translational movement positions the light source, said translational element carrying a member which is rotational about an axis directed in the direction of movement of the translational element, said rotational element providing the adjustment member which extends through the slot in the typhlocane's side wall, which slot is helical.

References Cited
UNITED STATES PATENTS

| | | | |
|---|---|---|---|
| 1,441,045 | 1/1923 | Tredwell | 43—18 X |
| 1,740,560 | 12/1929 | Andrews | 43—18 X |
| 2,216,716 | 10/1940 | Withem | 250—215 X |
| 3,245,002 | 4/1966 | Hall | 250—217 X |

(Other references on following page)

UNITED STATES PATENTS

| | | | |
|---|---|---|---|
| 2,582,728 | 1/1952 | Walker | 250—221 X |
| 3,170,151 | 2/1965 | Roth | 250—221 X |
| 3,198,952 | 8/1965 | Benham et al. | 250—221 |
| 3,393,600 | 6/1968 | Bess | 250—221 X |

FOREIGN PATENTS

| | | | |
|---|---|---|---|
| 1,147,773 | 11/1957 | France | 135—45 |

ARCHIE R. BORCHELT, Primary Examiner

T. N. GRIGSBY, Assistant Examiner

U.S. Cl. X.R.

135—47; 250—217, 221, 222; 340—258; 356—1